Figure 1:
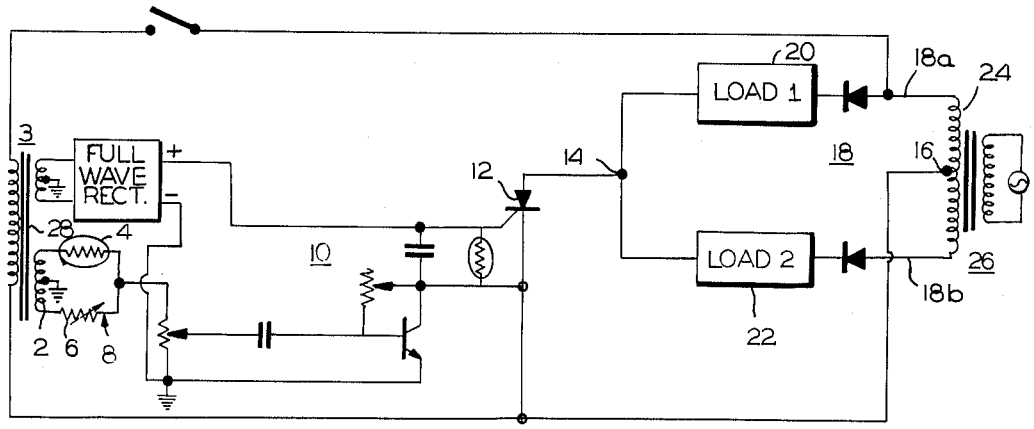

March 15, 1966

B. BURLEY 3,240,948

ELECTRONIC CONTROL RESPONSIVE TO OPPOSITE SENSES
OF CONDITION DEVIATION

Filed June 29, 1962

2 Sheets-Sheet 1

INVENTOR
BILLY BURLEY

BY Scrivener & Parker
ATTORNEYS

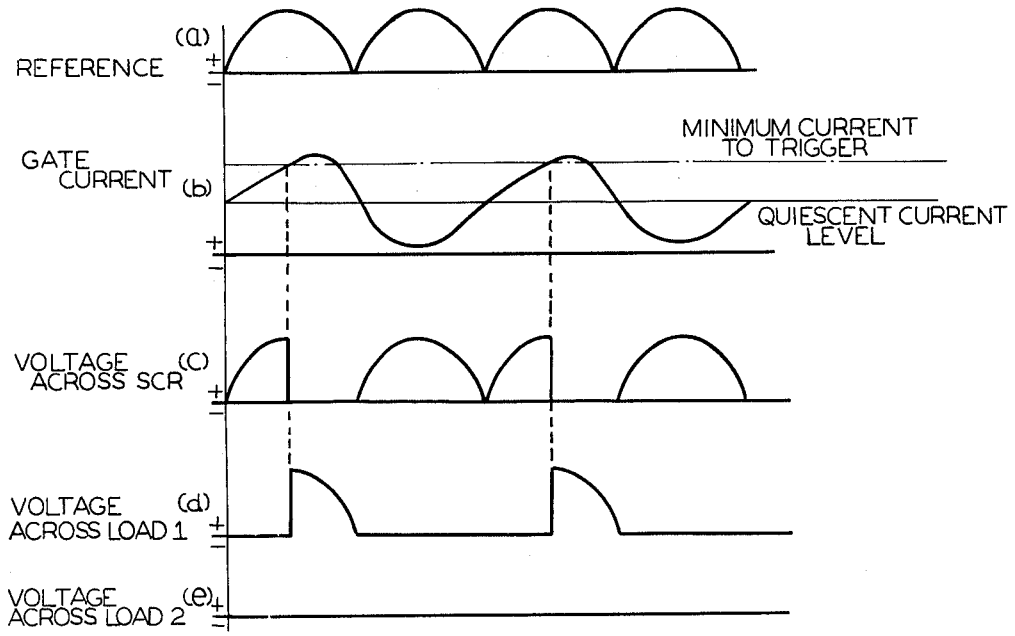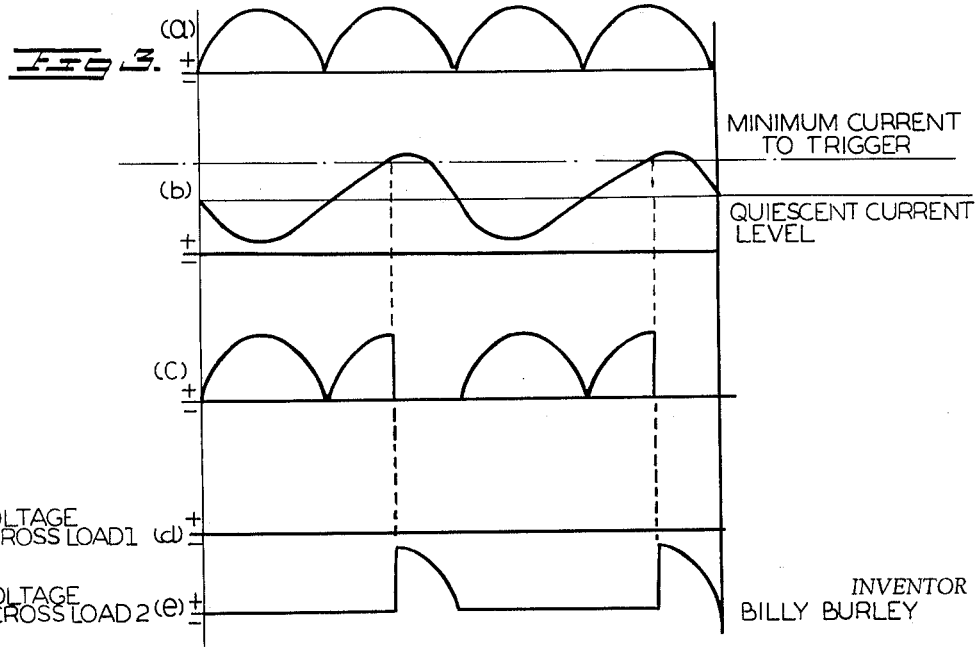

United States Patent Office 3,240,948
Patented Mar. 15, 1966

3,240,948
ELECTRONIC CONTROL RESPONSIVE TO OPPO-
SITE SENSES OF CONDITION DEVIATION
Billy Burley, Dallas, Tex., assignor, by mesne assignments,
to Johnson Service Company, Milwaukee, Wis., a corporation of Wisconsin
Filed June 29, 1962, Ser. No. 206,347
4 Claims. (Cl. 307—39)

This invention relates to an electronic control system affording modulating response to deviations in a condition in either sense from a predetermined value.

In my prior U.S. patent application Serial No. 206,345 filed June 29, 1962, now abandoned, and entitled "Condition-Responsive Electronic Control" a control system is disclosed that is operable to afford selective modulating response to deviations in a condition in either one of two opposite senses from a predetermined value. In the disclosed system when a measured condition is below a predetermined value, an output is produced that is a function of the magnitude of the deviation of the condition from the predetermined value. When the condition is above the predetermined value, the output is de-energized. By following the teachings of my U.S. patent application Serial No. 206,343 filed June 29, 1962 and entitled "Electronic System Affording Reversible Modulating Control," the response of the electronic control may be reversed so that when the measured condition exceeds the predetermined value, the output is a function of the magnitude of the condition deviation, and when the condition is below the predetermined value, the output is de-energized.

The present invention relates to a modification of the electronic control disclosed in the aforementioned application entitled "Condition-Responsive Electronic Control" and is characterized by the fact that modulating response is afforded for deviations in a condition in either sense from a predetermined value.

An object of the present invention is to provide an electronic system affording modulating control over a current-responsive load as a function of the magnitude of the deviation of a condition in either sense from a predetermined value.

Another object of the present invention is to provide an electronic system affording modulating control over a first current-responsive load when a measured condition deviates in one sense from a predetermined value, and over a second current-responsive load when the measured condition deviates in the opposite sense.

Another object of the present invention is to provide an electronic control system comprising a load circuit including a bistable device (for example, a silicon controlled rectifier) and at least one current-responsive load means for switching said bistable device between conductive and non-conductive conditions, and condition-responsive means controlling the duration of each of the conductive periods of said bistable device as a function of the magnitude of the deviation of a measured condition in either sense from a predetermined value.

A further object of the present invention is to provide an electronic control system comprising load circuit means including a bistable device (for example, a silicon controlled rectifier) and at least two current-responsive load devices, means for switching said bistable device between conductive and non-conductive conditions, and condition-responsive means operable to cause at least two of said loads to be energized and de-energized, respectively, when the measured condition varies in one sense from a predetermined value, and being operable to cause said loads to be de-energized and energized, respectively, when the measured condition varies in the opposite sense from the predetermined value, said condition-responsive means also being operable to control the lengths of the conductive periods of said bistable device as a function of the magnitude of condition deviation in either sense from a predetermined value.

Another object of the invention is to provide an electronic control system comprising a silicon controlled rectifier, load circuit means including a full-wave rectifier and at least one current-responsive load for applying full-wave rectified positive half-cycles of an A.-C. reference voltage across the anode to cathode circuit of said silicon controlled rectifier, and condition-responsive means causing said silicon controlled rectifier to be conductive during one of two series of alternate half cycles of said reference voltage in accordance with the sense of condition deviation from a predetermined value, said condition-responsive means also being operable to control the duration of the conductive periods of said silicon controlled rectifier as a function of the magnitude of the condition deviation. In accordance with the preferred embodiment of the invention, a pair of load devices are connected, respectively, in the opposite branches of a full-wave rectifier network. One series of the alternate half cycles of positive voltage applied to the load circuit electrodes of the silicon controlled rectifier are supplied by one branch, and the remaining half cycles of positive voltage are supplied by the other branch. Condition-responsive means connected with the gate electrode of the silicon controlled rectifier cause one or the other of the rectifier branches to be energized in accordance with sense of the deviation of a condition from a predetermined value. Furthermore, the condition-responsive means causes the effective level of a D.-C. current passing through the energized network branch to be a function of the magnitude of the condition deviation. In accordance with another embodiment of the invention, a current-responsive load device is connected in the load circuit of the electronic system intermediate a full-wave rectifier network and the anode to cathode circuit of a silicon controlled rectifier. Condition-responsive means connected with the control electrode of said silicon controlled rectifier cause the effective level of the D.-C. current sensed by the load to be a function of the magnitude of deviation of a condition from a predetermined value regardless of the sense of the deviation.

Figure 4:
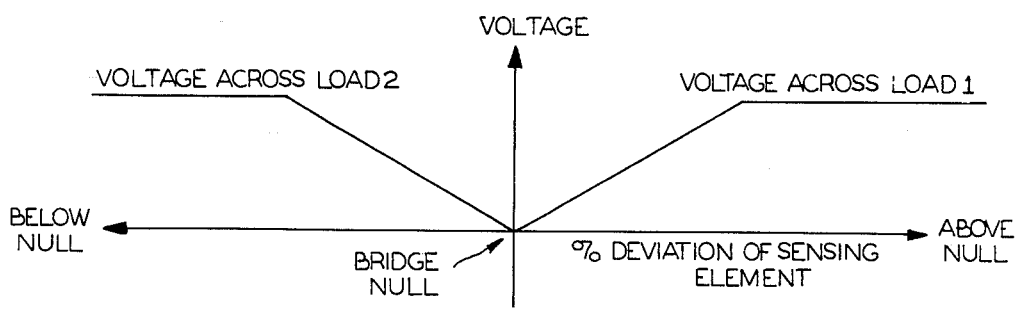
Figure 5:
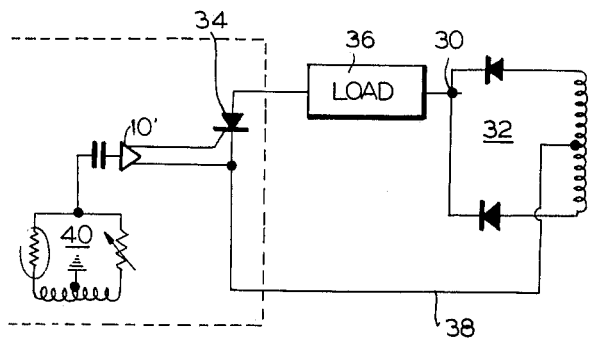

Other objects and advantages of the invention will become apparent from a study of the following specification when considered in conjunction with the accompanying drawing, in which:

FIG. 1 is a schematic circuit diagram of the preferred embodiment of the invention wherein the electronic system affords modulating control to one of two load devices in accordance with the sense of deviation of a condition from a predetermined value;

FIGS. 2(a)–2(e) illustrate the waveforms of the voltages that occur at various points of the circuit of FIG. 1 when the measured condition varies in one sense from a predetermined value, and FIGS. 3(a)–3(e) illustrate the corresponding waveforms when the condition varies in the opposite sense;

FIG. 4 illustrates the respective load voltage of the circuit of FIG. 1 for percent deviations in the measured condition above and below a predetermined value; and FIG. 5 illustrates another embodiment of the invention affording modulating control over a single load in response to deviations in a condition above and below a predetermined value.

Referring to FIG. 1, grounded center-tapped secondary winding 2 of transformer 3 is connected in series with condition-responsive resistor 4 and variable resistor 6 to define bridge network 8 the output junction of which is capacitively connected with the input of amplifier 10. The amplifier output is connected in series with the gate to cathode circuit of silicon controlled rectifier 12 as disclosed in the aforementioned patent application entitled "Condition-Responsive Electronic Control." The anode to cathode circuit of the silicon controlled rectifier is connected in series with the positive and negative terminals (14 and 16, respectively) of full-wave rectifier network 18. Current-responsive loads 20 and 22 are connected in series with network branches 18a and 18b, respecively, which have alternate opposite states of energization. Network 18 includes branches 18a and 18b having alternate opposite states of energization and including series-connected current-responsive loads 20 and 22, respectively. Energization of the network is afforded by secondary winding 24 of power (i.e., reference voltage) transformer 26. Secondary winding 24 is electrically connected with primary winding 28 of transformer 3 to establish a predetermined phase relationship between windings 2 and 24. Loads 20 and 22 (which may comprise, for example, the resistance heaters of expansible-media-operated actuators or other current-responsive devices) afford proportional response control over devices such as flow regulators connected in conduits supplying temperature modifying fluids.

*Operation*

Assume that condition-responsive resistor 4 is a thermistor, that variable resistor 6 is set to establish a balanced condition of bridge 8 when sensed temperature equals 75° F., and that the adjustable base electrode biasing resistor of amplifier 10 is set to establish a level of D.-C. current in the gate to cathode circuit of SCR 12 that is slightly below the gate triggering value. SCR 12 is in a non-conductive condition and full-wave rectified positive half cycles of the reference voltage are applied across the anode to cathode circuit of SCR 12 by full-wave rectifier network 18. Since SCR 12 is non-conductive, both loads 20 and 22 are de-energized.

Assume now that the sensed condition falls below the predetermined value. An A.-C. signal voltage (resulting from unbalance of condition-responsive bridge 8) is applied to the input of amplifier 10 and has a given phase relationship relative to the reference voltage and a magnitude that corresponds with the degree of condition deviation from the predetermined value. As disclosed in the aforementioned patent application entitled "Condition-Responsive Electronic Control," the "conduction angle" of SCR 12 relative to the reference voltage (and consequently, the lengths of the conductive periods of SCR 12) is a function of the magnitude of the signal voltage. Referring to FIG. 2, it will be seen that SCR 12 becomes conductive when the instantaneous effective gate current (i.e., the sum of the D.-C. quiescent gate biasing current and the amplified signal voltage resulting from unbalance of bridge 8) exceeds the triggering level during alternate half-cycles of the signal voltage. The triggering of SCR 12 occurs during those alternate full-wave rectified half cycles of the reference voltage that are transmitted by branch 18a of full-wave rectifier network 18, and consequently when SCR 12 becomes conductive, load 20 is enerfiized as shown in FIG. 2(d). The conduction angle of SCR 12 relative to the reference voltage, the duration of energization of load 20, and the effective level of D.-C. load current passing through load 20 are a function of the magnitude of the signal voltage (i.e., the degree of deviation of the condition from the predetermined value). At the end of each half cycle of the reference voltage, the anode to cathode potential of SCR 12 falls below the "holding value" and consequently SCR 12 becomes non-conductive. Since SCR 12 can never become conductive during the negative half cycles of the signal voltage (because the gate current does not exceed the triggering value during these half cycles), SCR 12 is non-conductive each time positive half cycles are supplied by branch 18b of network 18. Consequently, load 22 is never energized when the sensed condition is below the predetermined value (see FIG. 2(e)). It is apparent, therefore, that when the sensed condition is below the predetermined value, the effective load current through branch 18a and load 20 is a function of the degree of condition deviation, and load 22 is continuously in a de-energized condition.

If the sensed condition should rise above the predetermined value, bridge 8 will be unbalanced on the other side of null whereby the phase relationship of the signal voltage to the reference voltage is reversed. The magnitude of the signal voltage will, of course, be a function of the degree of condition deviation. Owing to the phase reversal of the amplified A.-C. signal voltage superimposed upon the D.-C. quiescent gate current, SCR 12 is now conductive during the periods in which positive half-cycles of the full-wave rectified reference voltage are supplied by branch 18b of full-wave rectifier network 18. The level of the effective D.-C. current sensed by load 22 is a function of the conduction angle of SCR 12 relative to the reference voltage, the magnitude of the signal voltage, and the degree of condition deviation. Since SCR 12 is non-conductive during the periods when positive half cycles are produced by branch 18a, load 20 is continuously de-energized when the sensed condition exceeds the predetermined value.

Thus it is apparent that with the dual-load embodiment of FIG. 1, modulating control over one load is achieved when the condition deviates in one sense from a predetermined value, and modulating control over the other load is achieved when the condition deviates in the opposite sense. FIG. 4 illustrates the respective load voltages for the two loads of FIG. 1 for deviations in a condition in opposite senses from a predetermined value.

It should be mentioned that by suitable reversal of the modulating control (i.e., phase relationships between signal and reference voltages) as taught by my prior patent application Serial No. 206,343 filed June 29, 1962 and entitled "Electronic System Affording Reversible Modulating Control," load 22 may be caused to be responsive to condition deviation below the predetermined value and load 20 may be caused to be responsive to condition deviation above the predetermined value.

Modulating control in response to condition deviations in opposite senses from a predetermined value may also be achieved with a single current-responsive load. Referring to the embodiment of FIG. 5, the positive terminal 30 of full-wave rectifier network 32 is connected with the anode electrode of silicon controlled rectifier 34 via load 36, and the negative terminal of the rectifier network is connected with the cathode electrode of SCR 34 via conductor 38.

When condition-responsive bridge 40 is balanced, the quiescent D.-C. gate to cathode circuit biasing current is below the triggering value of SCR 34 and consequently the silicon controlled rectifier is non-conductive and load 36 is de-energized. Positive half cycles of the full-wave rectified reference voltage are applied across the open circuited anode and cathode electrodes of SCR 34.

Upon unbalance of condition-responsive bridge 40 in one sense, a signal voltage of a given phase relationship relative to the reference voltage is produced having a magnitude proportional to the deviation in a sensed condition from a predetermined value. SCR 34 becomes conductive during these alternate half cycles of the anode to cathode reference voltage in which the signal voltage is positive. As disclosed in the aforementioned application entitled "Condition-Responsive Electronic Control," the conduction angle of SCR 34 relative to the reference voltage and the level of the effective D.-C. current passing through load 36 is a function of the magnitude of the bridge unbalance signal voltage and the degree of deviation of the sensed condition from a predetermined value. During the other alternate half cycles of the reference voltage, SCR 34 is non-conductive and load 36 is de-energized.

Upon unbalance of bridge 40 in the opposite sense, the phase relationship of the signal voltage relative to the reference voltage is reversed, and consequently the silicon controlled rectifier becomes conductive during said other alternate half-cycles of A.-C. reference voltage. Load 36 continues to sense a current level that is a function of the magnitude of the condition deviation. During the remaining half cycles of reference voltage, SCR 34 is non-conductive and load 36 is de-energized.

Consequently, it is apparent that in the embodiment of FIG. 5, the load 36 senses a load current that is a function of the magnitude of the deviation from a predetermined value regardless of the sense of the deviation from said predetermined value.

The condition-responsive bridge may be of the variable resistance, capacitance, inductance or impedance type responsive to deviations in such conditions as temperature, humidity, pressure, magnetic fields, rate of flow, or the like. Moreover, instead of the disclosed condition-responsive bridge network, other means (for example, a differential transformer) may be used which produce signal voltages having the magnitude and phase relationship described above for operation of the electronic control system.

While in accordance with the provisions of the patent statutes I have illustrated and described the preferred and best alternate embodiments of the invention now known to me, it will be apparent to those skilled in the art that other changes may be made in the apparatus described without deviating from the invention set forth in the following claims.

What is claimed is:

1. An electronic control system, comprising
   load circuit means including a current-responsive load, a silicon controlled rectifier means having anode and cathode power circuit electrodes and a gate electrode, and full wave rectifier means connected with said power circuit electrodes and said load for energizing said load with a pulsating voltage under control of said silicon controlled rectifier means, said full wave rectifier means including a first winding; and
   normally-balanced condition-responsive network means connected with said gate electrode for controlling the operation of said silicon controlled rectifier to cause the voltage applied to the load and the effective current sensed by the load to be a function of the sense and magnitude of the deviation of a condition from a predetermined value, said condition-responsive network means including a second winding, and means energizing said second winding to having a given frequency and phase relationship relative to said first winding whereby deviation of the condition in one sense applies corresponding half cycles of each full cycle of the power and deviation in an opposite sense applies the corresponding opposite half cycles of each full cycle.

2. An electronic system affording modulating control in response to deviations in a given condition in either sense from a predetermined value, comprising
   current-responsive load means;
   a silicon controlled rectifier having anode and cathode power circuit electrodes and a gate electrode;
   means connecting said power circuit electrodes with said load means for controlling the flow of current therethrough, said connecting means comprising first network means including a first winding having a center-tapped first terminal connected with one of said power circuit electrodes, a second terminal connected with the other power circuit electrode, and a pair of first network branches each connected at one end with said second terminal and at the end with opposite ends of said first winding, said network branches each including a uni-directionally conductive device, said devices having the same polarity relative to said second terminal;
   a second normally-balanced network including a second winding having a center-tapped third terminal, a fourth terminal, and a pair of second network branches each connected at one end with said fourth terminal and at the other end with opposite ends of said second winding, respectively, one of said second branches including condition-responsive means having an electrical characteristic that varies as a function of condition deviation, the other of said branches including means having the same electrical characteristic for balancing said second network when said condition has a given initial value;
   alternating-current voltage means for energizing said first and second windings to cause said windings to have a given frequency and phase relationship; and
   means connecting the terminals of said second network with said gate electrode to cause conduction of said silicon controlled rectifier during one of two series of alternate half cycles of said voltage in accordance with the sense of deviation of the condition from the initial value and for conductive periods the lengths of which are a function of the magnitude of the condition deviation.

3. An electronic system affording modulating control in response to deviations in a condition in opposite senses from a predetermined value, comprising
   a silicon controlled rectifier having anode and cathode power circuit electrodes and a gate electrode;
   a first network including a first winding having a center tap terminal, a second terminal, and a pair of first network branches each connected at one end with said second terminal and at the other end with opposite ends of said winding, respectively, each of said branches including in series a uni-directionally conductive device, the polarities of said devices being the same relative to said second terminal;
   a current-responsive load;
   means connecting said load and said power circuit electrodes in series across the terminals of said first network;
   a second normally-balanced network including a second winding having a center-tapped third terminal, a fourth terminal, and a pair of second network branches each connected at one end with said fourth terminal and at the other end with opposite ends of said second winding, respectively, one of said second branches including condition-responsive means having an electrical characteristic that varies as a function of condition deviation, the other of said branches including means having the same electrical characteristic for balancing said second network when said condition has a given initial value;
   alternating-current voltage means for energizing said first and second windings, whereby said windings have a given frequency and phase relationship; and
   means connecting the terminals of said second network with said gate electrode to cause conduction of said silicon control rectifier during alternate half cycles of said voltage means for conductive periods the lengths of which are a function of the degree of deviation of the condition in either sense from the initial value.

4. An electronic system affording modulating control in response to deviations in a condition in opposite senses from a predetermined value, comprising
   a silicon controlled rectifier having anode and cathode power circuit electrodes and a gate electrode;
   a pair of current-responsive loads;

first network means connected with said loads and including a first winding having a center tap terminal, a second terminal, and a pair of alternately-energized first network branches each connected at one end with said second terminal and at the other end with opposite ends of said winding, respectively, each of said branches including in series a uni-directional conductive device, the polarities of said devices being the same relative to said second terminal, said loads being connected in series in said first network branches intermediate said uni-directionally conductive devices, respectively, and said second terminal;

means connecting said power circuit electrodes in series across the terminals of said first network;

a second normally-balanced network including a second winding having a center-tapped third terminal, a fourth terminal, and a pair of second network branches each connected at one end with said fourth terminal and at the other end with opposite ends of said second winding, respectively, one of said second branches including condition-responsive means having an electrical characteristic that varies as a function of condition deviation, the other of said branches including means having the same electrical characteristic for balancing said second network when said condition has a given initial value;

alternating-current voltage means for energizing said first and second windings, whereby said windings have a given frequency and phase relationship; and means connecting the terminals of said second network with said gate electrode to cause conduction of said silicon controlled rectifier and energization of a given one of said first network branches during alternate half cycles of said voltage means in accordance with the sense of deviation in a condition from the initial value and for conductive periods the lengths of which are a function of the magnitude of the condition deviation.

References Cited by the Examiner
UNITED STATES PATENTS

| | | | |
|---|---|---|---|
| 2,585,005 | 2/1953 | Godshalk et al. | 323—75 X |
| 2,684,203 | 7/1954 | MacGeorge | 323—75 |
| 2,859,402 | 11/1958 | Schaeve | 323—22 |
| 2,897,379 | 7/1959 | Hinsdale | 307—88.5 |
| 2,907,932 | 10/1959 | Patchell | 317—148.5 |
| 2,924,757 | 2/1960 | Schaeve | 317—148.5 |
| 3,159,737 | 12/1964 | Dora | 219—501 |

LLOYD McCOLLUM, *Primary Examiner.*

MILTON O. HIRSHFIELD, *Examiner.*

T. J. MADDEN, L. R. CASSETT, *Assistant Examiners.*